United States Patent
Fowler et al.

[11] 3,809,228
[45] May 7, 1974

[54] TEMPERATURE PROBE COVER

[76] Inventors: Charles F. Fowler, 5157 Park West Ave., San Diego, Calif. 92117; Samuel G. Dawson, 1869 Hidden Mesa Rd., El Cajon, Calif. 92020

[22] Filed: Mar. 1, 1972

[21] Appl. No.: 230,790

Related U.S. Application Data

[63] Continuation-in-part of Ser. No. 85,388, Oct. 30, 1970, abandoned.

[52] U.S. Cl..............................206/306, 206/498
[51] Int. Cl............................................. B65d 85/20
[58] Field of Search........ 128/260; 206/16.5, 46 ST, 206/56 AA, 63.2 R, DIG. 32

[56] References Cited
UNITED STATES PATENTS

| | | | |
|---|---|---|---|
| 3,552,558 | 1/1971 | Poncy | 206/63.2 R |
| 3,308,940 | 3/1967 | Morris, Jr. | 206/16.5 X |
| 3,221,871 | 12/1965 | Hidding | 206/16.5 |
| 3,092,252 | 6/1963 | Brause et al. | 206/63.2 R |
| 3,215,265 | 11/1965 | Welin-Berger | 206/63.2 R |

FOREIGN PATENTS OR APPLICATIONS

| | | | |
|---|---|---|---|
| 310,564 | 5/1969 | Sweden | 206/16.5 |

*Primary Examiner*—William I. Price
*Assistant Examiner*—Steven E. Lipman
*Attorney, Agent, or Firm*—Brown & Martin

[57] ABSTRACT

A temperature probe cover with an inner sheath and outer jacket, with the inner sheath constructed of thin virtually non-porous sheet material that is capable of being sterilized during manufacture along with the inner surface of the jacket. The exterior of the inner sheath is sealed and remains sterile within the outer jacket until the latter is removed, normally after insertion of the thermometer probe into the inner sheath. The jacket is preweakened at a point adjacent the seal allowing localized rupture of the jacket without endangering the integrity of the sealing of the inner sheath. The sheath and jacket have an opening that is spaced for easy insertion of the temperature probe.

18 Claims, 16 Drawing Figures

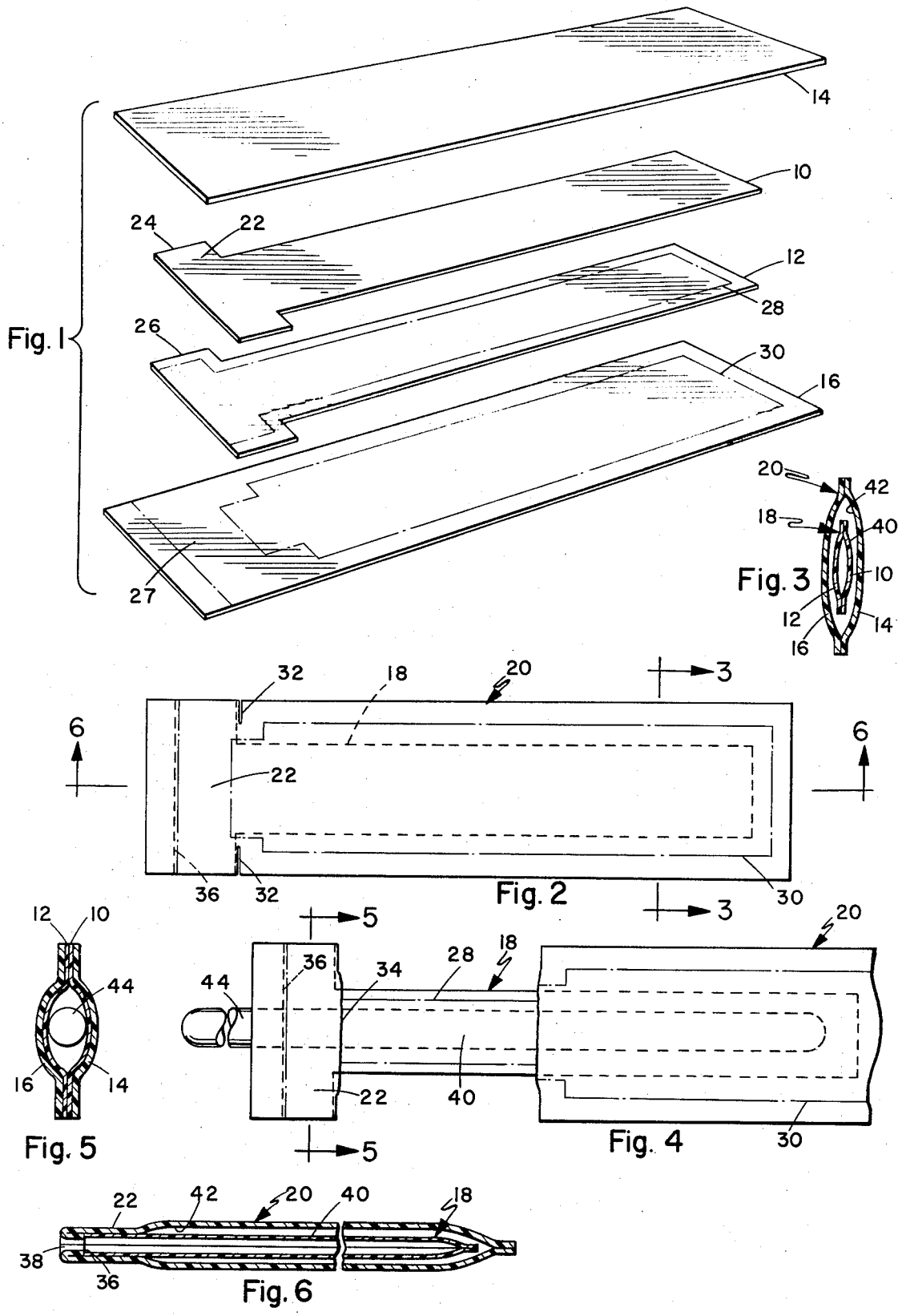

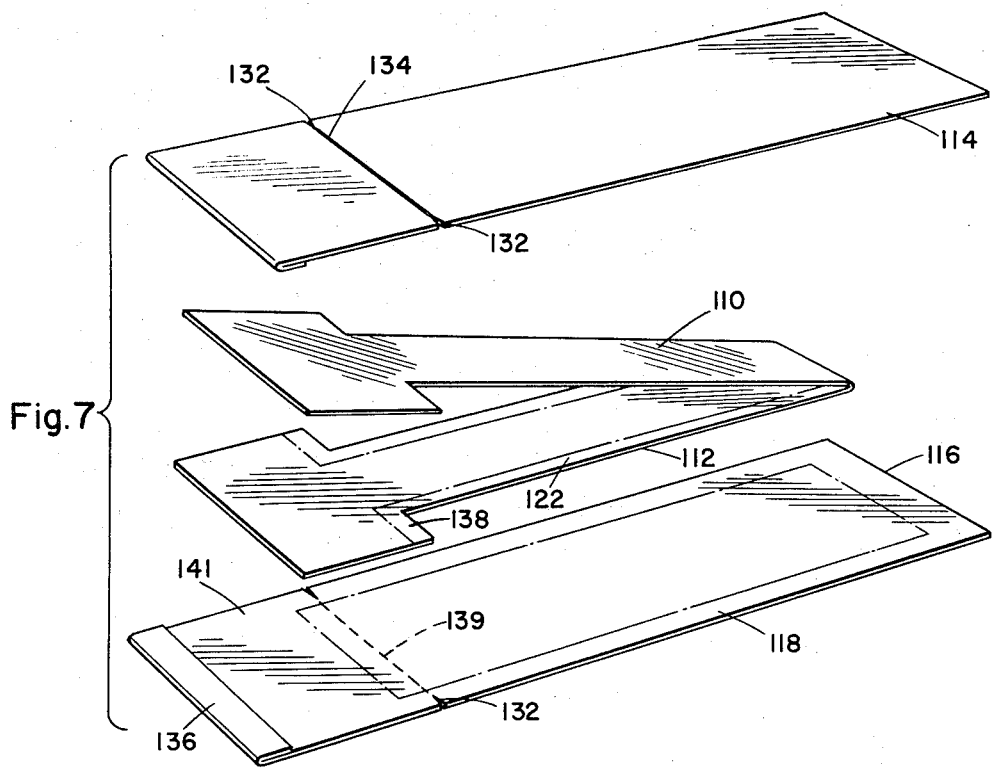
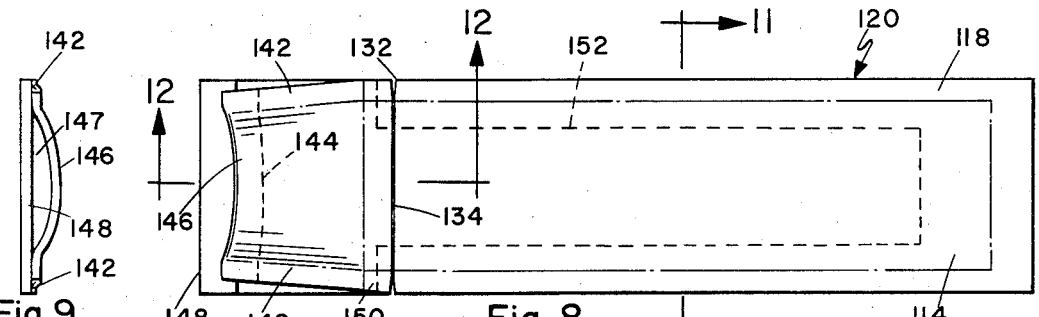
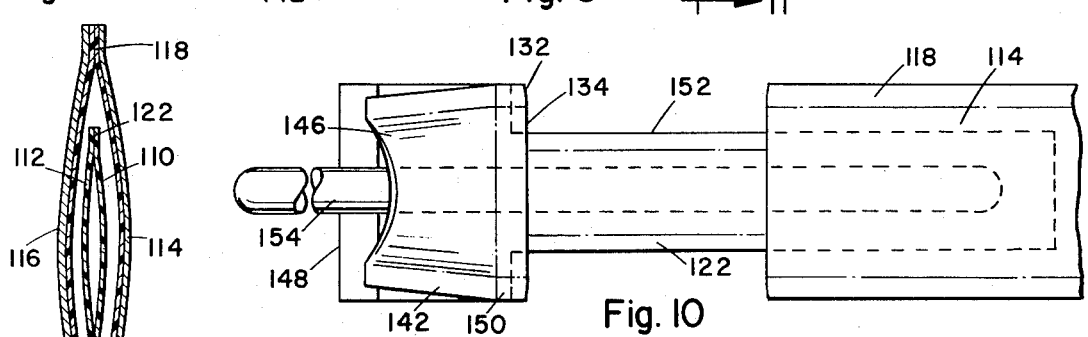
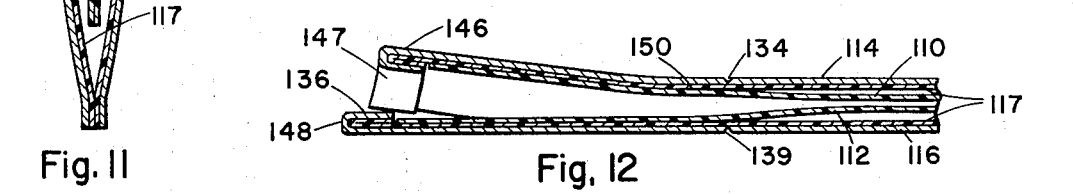

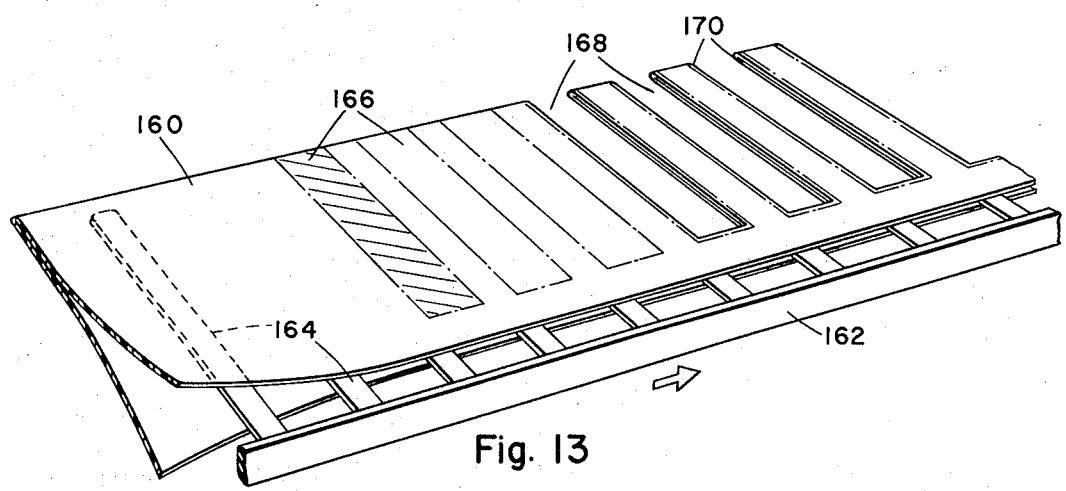
Fig. 13
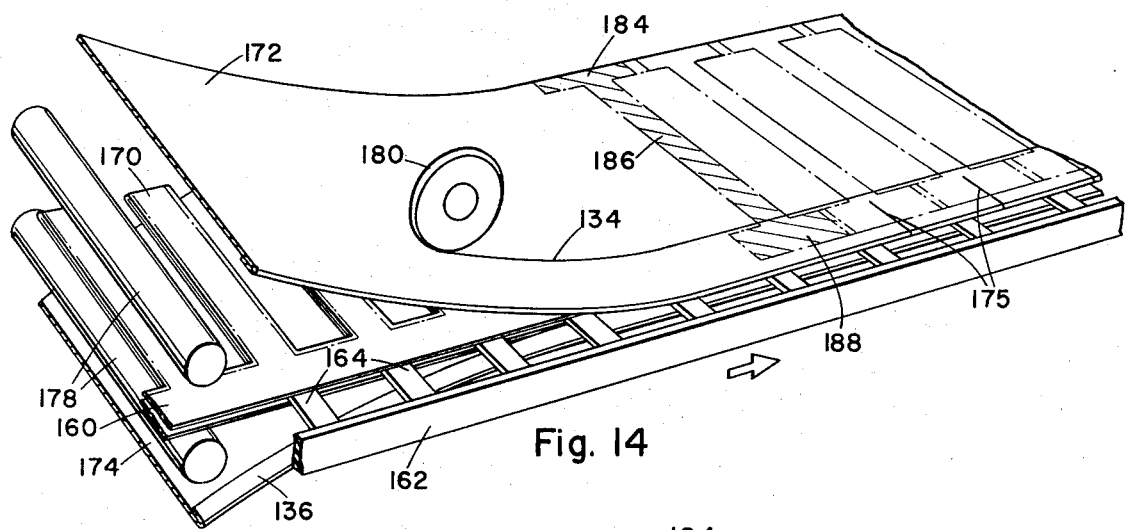
Fig. 14
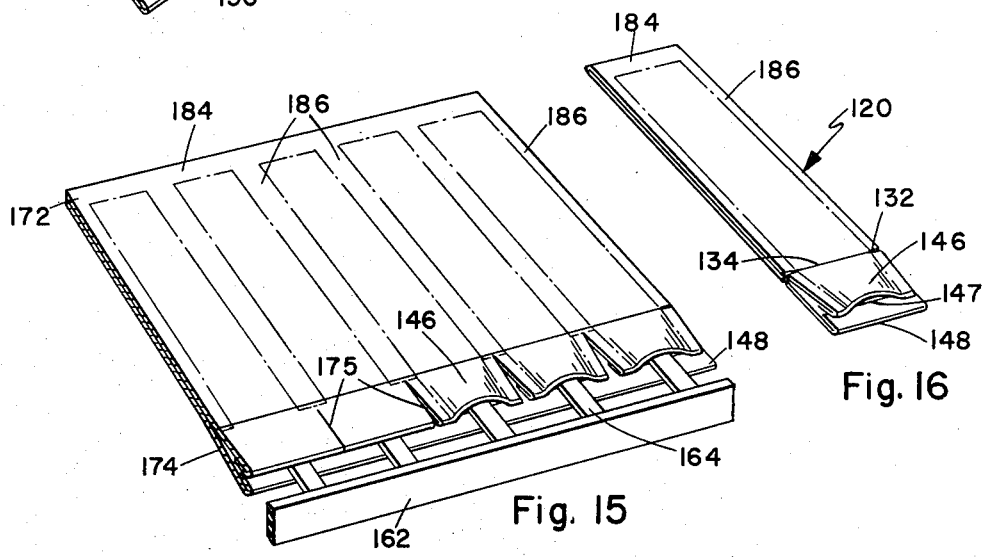
Fig. 15
Fig. 16

3,809,228

TEMPERATURE PROBE COVER

This application is a continuation-in-part of an application filed Oct. 30, 1970, Ser. No. 85,388, now abandoned.

BACKGROUND OF THE INVENTION

Several known items have been used or proposed as thermometer covers or temperature probe covers in response to a recognized need to lessen contagion arising from the re-use of a temperature probe without adequate sterilization, and the considerable difficulty, awkwardness, time consumption and expense of the commonly employed sterilization methods due to the very nature of the temperature probes, thermometers and the like and their use in the mouth or other portions of the human body. These prior art covers have not been satisfactory in providing a protector that is easily made, has sterilized cover integrity during the insertion of the temperature probe and the removal of the outer jacket, and is economically made. Further in such known devices, it is often difficult to insert the probe into the protective cover, and once the probe has been inserted into the protective cover, then a considerable amount of dexterity and experience is required to remove the outer covering from the inner sterilized probe cover, without causing contact between the user's hands and the sterilized probe cover.

Thus it is advantageous to have a new and improved temperature probe cover and method of making same and using same.

SUMMARY OF THE INVENTION

In an exemplary embodiment of the temperature probe cover and method of using and making same, an elongated inner sheath is made of thin sheet material that is virtually non-porous, is positioned in an elongated outer jacket that is made of similar or the same non-porous sheet material. Both the inner surface of the outer jacket and the outer surface of the inner sheath are easily sterilized, such as by ultraviolet light or other means, during fabrication. At one end of the cover, the inner sheath and outer jacket are sealed together forming the sealed inner cavity that protects and maintains the sterilized area from contact with the atmosphere, and further defines a mouth in the sheath for accepting the end of a temperature probe. Thus the sheath remains sterile until intentionally exposed by tearing off the jacket after the probe is inserted.

The parts are shaped so that the outer jacket is weakened in a localized area by scoring or the like. Thus after the temperature probe is inserted into the inner sheath, the outer jacket is gripped at the sealed end with one hand and with the other hand pulling on the end of the jacket, the scored area ruptures allowing the major portion of the jacket to be pulled from the inner sheath exposing the sheath and the temperature probe therein for use. This is accomplished without making it possible to accidently touch the sterilized outer sheath surface.

In forming the inner sheath and outer jacket, and in bonding adjacent surfaces together, the common opening is reinforced by adding layers of the material, giving the opening a greater degree of structural firmness. In the manufacture thereof, one side of the common opening is given an arcuate shape that provides an opening that is normally held in the spaced open position. Thus the temperature probe may be easily inserted into the spaced opening, reducing the problems of prior devices wherein one must poke with the probe in attempting to find the opening in the sterilized cover. Also the jacket may be scored in any of several ways, such as by slitting the jacket on opposite sides which sometimes requires a twisting of the jacket to assure the parting thereof along the desired line, or by scoring the jacket throughout its entire periphery thus making it necessary to merely pull on one end of the jacket to assure its parting at the localized weakened and scored area. The latter has the advantage of reducing the possible contact of the user's hands with the sterilized outer sheath and probe cover.

Further applicant employs a unique method of making the probe cover, that assures the sealed and sterilized structure, as well as having the spaced opening into the probe cover.

It is therefore an object of the invention to provide a new and improved temperature probe cover.

It is another object of this invention to provide a new and improved method of making a disposable cover for a temperature probe.

It is another object of this invention to provide a new and improved sterilized temperature probe cover for a temperature probe.

It is another object of this invention to provide a new and improved disposable probe cover for a temperature probe that has a spaced opening that is held in the spaced open position for receiving the end of the temperature probe.

It is another object of this invention to provide a new and improved disposable cover for a temperature probe and method of manufacture of same that has a sterilized sheath with an outer jacket having a common mouth that is normally spaced open and has a weakened portion that allows one end of the jacket to be grasped pulling a substantial portion of the jacket from the probe cover in a manner that the hands of the user are not in position to contact the sterilized surface of the sheath.

These and other objects and advantages of this invention will become more apparent upon a reading of the following detailed description and an examination of the drawings, wherein like reference numerals designate like parts throughout and in which:

FIG. 1 is an exploded view in disassembled form of an embodiment of the cover.

FIG. 2 is a top plan view of the assembled cover illustrated in FIG. 1.

FIG. 3 is a sectional view taken on line 3—3 of FIG. 2.

FIG. 4 is a top plan view with the inner sheath partially withdrawn and with a temperature probe inserted.

FIG. 5 is a sectional view taken on line 5—5 of FIG. 4.

FIG. 6 is a sectional view taken on line 6—6 of FIG. 2.

FIG. 7 is an exploded view of a disassembled, modified form of the cover.

FIG. 8 is a top plan view of the modified cover.

FIG. 9 is an end view taken from the left hand end of FIG. 8.

FIG. 10 is a top plan view with a thermometer inserted and the inner sheath partially withdrawn.

FIG. 11 is an enlarged sectional view taken on line 11—11 of FIG. 8.

FIG. 12 is an enlarged sectional view taken on line 12—12 of FIG. 8.

FIGS. 13, 14 and 15 illustrate the successive steps in the method in making the covers.

FIG. 16 is a perspective view of a complete cover as cut off at the final step of the method of FIG. 15.

Referring to the drawings, the temperature probe or thermometer cover is constructed in this embodiment from four elongated strips, 10, 12, 14 and 16. These strips are normally of thin virtually non-porous sheet material that is capable of being sealed, such as being thermally or hermetically sealed, cut and sterilized, as for example by ultraviolet light or other suitable means. These strips form an inner envelope, hereinafter called sheath 18, that is made from strips 10 and 12. The material of sheath 18 should form a reasonably good thermal conductivity to the temperature probe and this is enhanced by minimizing the thickness of the particular sheet, which is practice may be made of a suitable plastic. Examples of suitable plastic or plastic type materials that may be used, is that sold under the trademark and description "Scotch Pack, Type B" that is "Mylar" plastic coated with polyethylene, that may have a thickness on the order of 1 mil. This sheath 18 may also be made of a very thin plastic having a thickness of less than 1 mil. Strips 14 and 16 form an outer cover that is open at only one end, hereinafter called a jacket 20. The strips 14 and 16 may be thicker than the sheath 18 and thus may be on the order of 3 or 4 mils. However the jacket 20 will be made of material having an inner surface, that may be bonded, cemented or otherwise secured to the outer surface of the sheath 18 forming a sealed connection. The jacket, being the outer cover, would normally have a thickness on the order of 3 or 4 mils. One suitable material for the jacket 20 is sold under the name "Glassine" and is a laminant of paper and polyethylene.

The major portion of the sheath 18 is narrower than the jacket 20 so that it may freely fit within the jacket. At one end, the sheath 18 has a wider or shoulder portion 22 that is formed from portions 24 and 26, see FIG. 1. The strips 10 and 12 are sealed, such as by heat bonding and the like, on the peripheral areas of the three sides as indicated by dash line 28. A similar sealing by heat bonding or the like of the strips 14 and 16 is indicated by dotted line 30. It should be understood that in the area 27, of the strips 14 and 16, the jacket sides are bonded directly to the adjacent sides of the sheath 18, forming a shoulder portion 22.

A pair of opposing lateral slits 32 are formed in the respective sides of the jacket 20 and are just below the lower edge of the shoulder portion 22. Thus the lateral slits 32 are contained entirely within the bonded area of the jacket 20 and are not in the area in which the jacket is bonded to the sheath 18. So the sealing between the jacket 20 and the sheath 18 extends across the width of the cover and is not interferred with by slits 32. Since the area 22 comprises the laminate of the linner sheath and the outer jacket, the area of the shoulder portion 22 is slightly stiffened. The regional sealing further aids in this stiffening and improves the user's ability to grasp the shoulder portion 22, as necessary, in twisting and tearing action required to rupture the jacket along the weakened portion of line 34 joining the slits 22, as necessary in removal of the jacket as illustrated in FIG. 4.

For facilitation of entering the temperature probe into the common mouth opening of the opening in the jacket 20 and the mouth of the sheath 18, the forward ends of the sheets 14 and 16 are returned inwardly as at 36. This structure further provides lips in defining a mouth 38 through which the temperature probe enters the mouth 38 of the sheath 18. The returned edges at 36 are thicker than the adjacent edges of the sheat and this further facilitates entry of the temperature probe 44.

The cover can be stacked flat for storage, and is sterilized by ultraviolet light or otherwise during manufacture will remain sterile indefinitely as to the protected surfaces, that is, the outer surface 40 of the sheath 18 and the inner surface 42 of the jacket 20.

In operation, a temperature probe 44, that may be a simple thermometer, is inserted into the mouth 38 and pushed until the temperature sensing end is well within or at the end of the sheath 18. During this period of time, one hand of the user grips the thermometer and the cover at the cover portion 22. The other hand grasps the jacket 20 below the scored portion or slits 32, and in a limited twisting and pulling motion on the cover causes rupture of the jacket along line 34. The jacket is then removed and discarded. The temperature probe with the sterilized cover is then used in the normal manner and the used sheath is also expendible and easily disposable.

Referring now to FIGS. 7 through 12, there is illustrated another embodiment of the disposable cover for temperature probe of this invention. The parts 110 and 112 that form the sheath 152 are connected at their narrow end. The sheath 152 is bonded together such as by thermal bonding in areas 122 and 138. The outer jacket 120 is formed by the bonding of the layers 114 and 116 in the bonded areas 118. The outer jacket 120 is also bonded in the area 141 against the outer surfaces of the sheath 152, as previously described, forming a bond area that extends to dotted line 139. The ends 136 of the jacket are turned over to form a stiffening lip for the opening to the mouth of the sheath 152.

The jacket 120 and the sheath 152 are made of the same materials as previously described relative to the embodiment illustrated in FIGS. 1 through 6. Alternatively the jacket may have a double layered thickness with the outer layer 116 being of paper with an inner surface layer 117 of plastic film bonded thereto. The jacket is scored along line 134 by cutting into the outer surface of the jacket 120. Also the sides may be slit forming the localized weakened area. The second groove or cut 134 does not penetrate through the jacket 120 and thus maintains the integrity of the sealed and sterilized volume therein. The slits 132 are well within the bonded area 118 and thus do not penetrate the sealed area.

The mouth 147 of the common opening is formed to have a flat side 148 and an arcuate side 146. The arcuate side 146 is formed by having the edges of the side comprising layers of the jacket and sheath, members 110 and 114, moved inwardly at an angle and bonded in areas 142. With the stiffening of the lips, this forms a mouth opening that is normally held in the spaced open condition. Also it will be noted that the lower side or lip 148 extends longitudinally beyond the edge of the upper portion 146, thus aiding in finding and inserting the probe end into the mouth 147.

In operation, the temperature sensitive end of the probe is projected through opening 147 and into the inner cavity of the sheath 152. The jacket and temperature probe are gripped in the manner previously described, however in this embodiment it is merely necessary to pull with the other hand on the extreme end of the jacket 120. The scored area 134 parts allowing the jacket to be quickly removed from the sheath with the hands of the user being entirely separated from the exposed area of the sheath 152.

In the method of making the disposable covers, a sheet of thin material such as plastic or the like to form the inner sheath 20 or 120 is doubled over to enclose a guide belt 162 having guide fingers 164. In this movement, welds or temperature bonding of the material together is accomplished in areas 166. These temperature bonds may be made in any suitable manner such as by a heating iron or the like. Areas 168 are then cut out of the bonded portion 166 in the subsequent step, forming sealed, bonded edges 170. The processed sheet 160 and the guide belt 162 then passes between two sheets 172 and 174 of the jacket material. The jacket material may be supplied from rollers or from any suitable source in which the ends 136 are already turned over and bonded into position. Ultraviolet lamps 178 are inserted between the processed sheet material 160 and the inner surfaces of the jacket material 172 and 174 to sterilize the respective surfaces. The sheets are then moved together where they are welded or bonded by any suitable equipment in areas 184, 186 and 188. This bonds the respective strips 172 and 177 together in areas 184 and 186 and to the respective sides of the processed sheet 160 in area 188. The edges are then slit at 175 in any suitable known manner.

In reference to FIG. 15, the bonded portions are then moved with the guide belt 162 to point where finger welding or bonding members (not shown) press down on the sides of the respective ends of the sheets adjacent the slits 175 and around the guide fingers 146. This causes the edge portions of the upper side to be moved inwardly at an angle as shaped by the particular tool and bonds the surfaces together forming bonds 142, as previously described in FIGS. 8, 9, 10 and 12. The finished disposable cover is then severed in the bond area 186 to provide each of the separate cover units.

A scoring wheel 180 or other suitable means provides the scored line 134 as previously described.

Having described our invention, we now claim.

1. A disposable cover for a temperature probe comprising,
   an elongated jacket of virtually nonporous sheet material open at one end only,
   an elongated thin sheath of similar material within said jacket and having one open end only defining a mouth that is adjacent said open end of said jacket to admit a temperature probe into said sheath,
   said sheath being solely sealed to said jacket adjacent said opening and said mouth to maintain external sterility of the sheet until the jacket is intentionally removed,
   and said jacket having a weakened portion solely adjacent the sealed connection to said sheath, whereby said jacket when pulled lengthwise in a direction allowing from said mouth will part at said weakened portion llowing the parted portion of said jacket to be removed from enclosing said sheath.

2. A disposable cover as claimed in claim 1 in which, the material of said sheath is thinner than the material of said jacket.

3. A disposable cover as claimed in claim 1 in which,
   said jacket being sealed to said sheath for a given length forming the end through which a temperature probe projects,
   and said sealed portion having a width sufficient to be grasped by a user's hands.

4. A disposable cover as claimed in claim 1 in which,
   said opening and said mouth defining a common mouth for said sealed together sheath and jacket with portions thereof extending beyond the common mouth to form lips that facilitate entry of a temperature probe therein.

5. A disposable cover as claimed in claim 1 in which,
   said elongated sheath having a "T" shape in elongated configuration,
   the surfaces of the wide portion of said "T" shape being separated with the external sides being bonded to the adjacent surface of the elongated jacket forming a common mouth,
   the narrow portion of said "T" shape being free from said jacket, and said weakened portion across said jacket being slightly below the wide portion of said sheath.

6. A disposable cover as claimed in claim 5 in which,
   the side edges of said sheath and said jacket adjacent said common mouth on one side thereof being angled inwardly to form a spaced opening into said common mouth.

7. A disposable cover for a temperature probe comprising,
   an elongated jacket of virtually nonporous sheet material open at one end only,
   an elongated thin sheath of similar material within said jacket and having one open end only defining a mouth that is adjacent said open end of said jacket to admit a temperature probe into said sheath,
   said sheath being sealed to said jacket adjacent said opening and said mouth to maintain external sterility of the sheet until the jacket is intentionally removed,
   said jacket having a weakened portion adjacent the sealed connection to said sheath, whereby said jacket when pulled lengthwise will part at said weakened portion allowing the parted portion of said jacket to be removed from enclosing said sheath,
   and said weakened portion being formed by at least one slit into the side edge of said jacket.

8. A disposable cover for a temprature probe comprising,
   an elongated jacket of virtually nonporous sheet material open at one end only,
   an elongated thin sheath of similar material within said jacket and having one open end only defining a mouth that is adjacent said open end of said jacket to admit a temperature probe into said sheath, said sheath being sealed to said jacekt adjacent said opening and said mouth to maintain external sterility of the sheet until the jacket is intentionally removed, said jacket having a weakened portion adjacent the sealed connection to said sheath, whereby said jacket when pulled lengthwise will part at said weakened portion allowing the parted portion of said jacket to be removed from enclosing said sheath, and said weakened portion being formed by said jacket being scored across a substantial portion of its surfacein a line adjacent to the sealed connection.

9. A disposable cover for a temperature probe comprising, an elongated jacket of virtually nonporous sheet material open at one end only, an elongated thin sheath of similar material within said jacket and having one open end only defining a mouth that is adjacent said open end of said jacket to admit a temperature probe into said sheath, said sheath being sealed to said jacket adjacent said opening and said mouth to maintain external sterility of the sheet until the jacket is intentionally removed, said jacket having a weakened portion adjacent the sealed connection to said sheath, whereby said jacket when pulled lengthwise will part at said weakened portion allowing the parted portion of said jacket to be removed from enclosing said sheath, and said weakened portion being formed by a cut in the outer surface of said jacket, which cut does not penetrate through the thickness of the wall of said jacket.

10. A disposable cover as claimed in claim 9 in which, said cut in said jacket terminating at each side of said jacket with a slit in the edge of said jacket.

11. A disposable cover as claimed in claim 9 in which, said jacket being formed of a double wall material, and said cut only penetrating said outer sheet material.

12. A disposable cover for a temperature probe comprising, an elongated jacket of virtually nonporous sheet material open at one end only, an elongated thin sheath of similar material within said jacket and having one open end only defining a mouth that is adjacent said open end of said jacket to admit a temperature probe into said sheath, said sheath being sealed to said jacket adjacent said opening and said mouth to maintain external sterility of the sheet until the jacket is intentionally removed, said jacket having a weakened portion adjacent the sealed connection to said sheath, whereby said jacket when pulled lengthwise will part at said weakened portion allowing the parted portion of said jacket to be removed from enclosing said sheath, said opening and said mouth defining a common mouth for said sealed together sheath and jacket with portions thereof extending beyond the common mouth to form lips that facilitate entry of a temperature probe therein, and one of said lips bowed relative to the other of said lips forming a parted opening into said common mouth.

13. A disposable cover as claimed in claim 12 in which, said lips being formed by the end of said jacket having returned edges that stiffen said common mouth into said parted opening condition.

14. A disposable cover for a temperature probe comprising, an elongated jacket having an inner surface of virtually non-porous sheet material open at one end only, an elongated thin sheath of similar material within said jacket and having one open end only defining a common mouth with said open end of said jacket to admit a temperature probe into said sheath, said sheath being sealed to said jacket adjacent said common mouth to maintain external sterility of the sheath until the jacket is intentionally removed, and only one side of said jacket and said sheath at said common mouth being permanently formed to be normally bowed outwardly forming a spaced opening to said common mouth.

15. A disposable cover as claimed in claim 14 in which, said jacket has returned edges at one end thereof to stiffen said common mouth whereby said mouth maintains said spaced opening therethrough.

16. A disposable cover as claimed in claim 14 in which, said common mouth being formed by a planar side of said jacket and said sheath and the opposite sides of said jacket and sheath being bonded together at their side edges, and said one side of said jacket and sheet being bonded at an inward angle to the opposite side edges forming an outward projecting spaced opening.

17. A disposable cover as claimed in claim 16 in which, the outer ends of said common mouth forming lips.

18. A disposable cover as claimed in claim 16 in which, said jacket having a weakening portion solely adjacent the end having said common mouth, wherein said jacket when pulled lengthwise will part at said weakened portion allowing the parted portion of said jacket to be removed from enclosing said sheath.

* * * * *